United States Patent
Detter et al.

(10) Patent No.: US 9,613,241 B2
(45) Date of Patent: Apr. 4, 2017

(54) WIRELESSLY IDENTIFYING PARTICIPANT CHARACTERISTICS

(71) Applicant: Motorola Mobility LLC, Chicago, IL (US)

(72) Inventors: Craig J Detter, Gurnee, IL (US); Roger W Ady, Chicago, IL (US); Rachid M Alameh, Crystal Lake, IL (US); Balaji Thiagarajan, San Jose, CA (US)

(73) Assignee: Motorola Mobility LLC, Chicago, IL (US)

( * ) Notice: Subject to any disclaimer, the term of this patent is extended or adjusted under 35 U.S.C. 154(b) by 76 days.

(21) Appl. No.: 14/805,585

(22) Filed: Jul. 22, 2015

(65) Prior Publication Data

US 2017/0024591 A1    Jan. 26, 2017

(51) Int. Cl.
*G06K 7/10* (2006.01)
*G06F 3/01* (2006.01)
*H04W 4/00* (2009.01)

(52) U.S. Cl.
CPC ......... *G06K 7/10386* (2013.01); *G06F 3/017* (2013.01); *H04W 4/005* (2013.01)

(58) Field of Classification Search
CPC ............. G06K 7/0008; G06K 19/0723; G06K 7/10049; G06K 7/10356; G06K 7/10366; G06K 19/0712; G06K 19/0717; G06K 19/07749

USPC ........................................................ 340/10.31
See application file for complete search history.

(56) References Cited

U.S. PATENT DOCUMENTS

| | | | | |
|---|---|---|---|---|
| 8,905,855 B2 * | 12/2014 | Fitzpatrick | .............. | G06T 13/40 473/199 |
| 9,076,041 B2 * | 7/2015 | Bentley | ................... | A63F 13/00 |
| 9,406,336 B2 * | 8/2016 | Bose | ...................... | H04N 7/188 |
| 9,418,705 B2 * | 8/2016 | Kaps | ....................... | G11B 27/17 |
| 9,504,408 B2 * | 11/2016 | Hong | ................... | A61B 5/1123 |

* cited by examiner

*Primary Examiner* — Mark Blouin
(74) *Attorney, Agent, or Firm* — Miller, Matthias & Hull LLP

(57) ABSTRACT

A system and method for identifying persons near a mobile device includes a wireless signaling system including an incoming wireless signal receiver, a device motion sensing system including at least a first sensor and a controller configured to determine whether the device is being moved in accordance with a predetermined gesture and to responsively enter a personnel data collection mode. In the personnel data collection mode, the device may transmit a query and receives an identification signal from at least one other device and identifies a user of the device based on the received identification signal. The predetermined gesture is a spinning gesture in an embodiment. In an embodiment, a thermal sensor is used to identify or enumerate personnel. The identification signal may be one of a Bluetooth ID and a WiFi ID.

20 Claims, 6 Drawing Sheets

WIRELESSLY IDENTIFYING PARTICIPANT CHARACTERISTICS

TECHNICAL FIELD

The present disclosure is related generally to mobile device data collection, and, more particularly, to a system and method for gesture-based data collection.

BACKGROUND

Early cellular phones were used strictly for telephone calls. However, improvements in device design and cellular infrastructure have increased the capabilities of the average cell phone to the point that it is now used for business transactions, gaming, social media and other non-telephone tasks. Cell phones with sufficient memory and text input features are even used for data storage. For example, users often use their cell phones as a primary storage location for contact information However, in the digital age, with fewer people carrying business cards, it is burdensome and often awkward to collect and record contact information for everyone present at even a small meeting or event. Such an activity takes time away from the purpose of the gathering and creates significant inefficiencies for the all involved. Nonetheless, such a gathering is still an excellent opportunity to acquire and record contact information in some way.

While the present disclosure is directed to a system that can eliminate some of the shortcomings noted in this Background section, it should be appreciated that any such benefit is not a limitation on the scope of the disclosed principles, nor of the attached claims, except to the extent expressly noted in the claims. Additionally, the discussion of technology in this Background section is reflective of the inventors' own observations, considerations, and thoughts, and is in no way intended to accurately catalog or comprehensively summarize the prior art. As such, the inventors expressly disclaim this section as admitted or assumed prior art with respect to the discussed details. Moreover, the identification herein of a desirable course of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
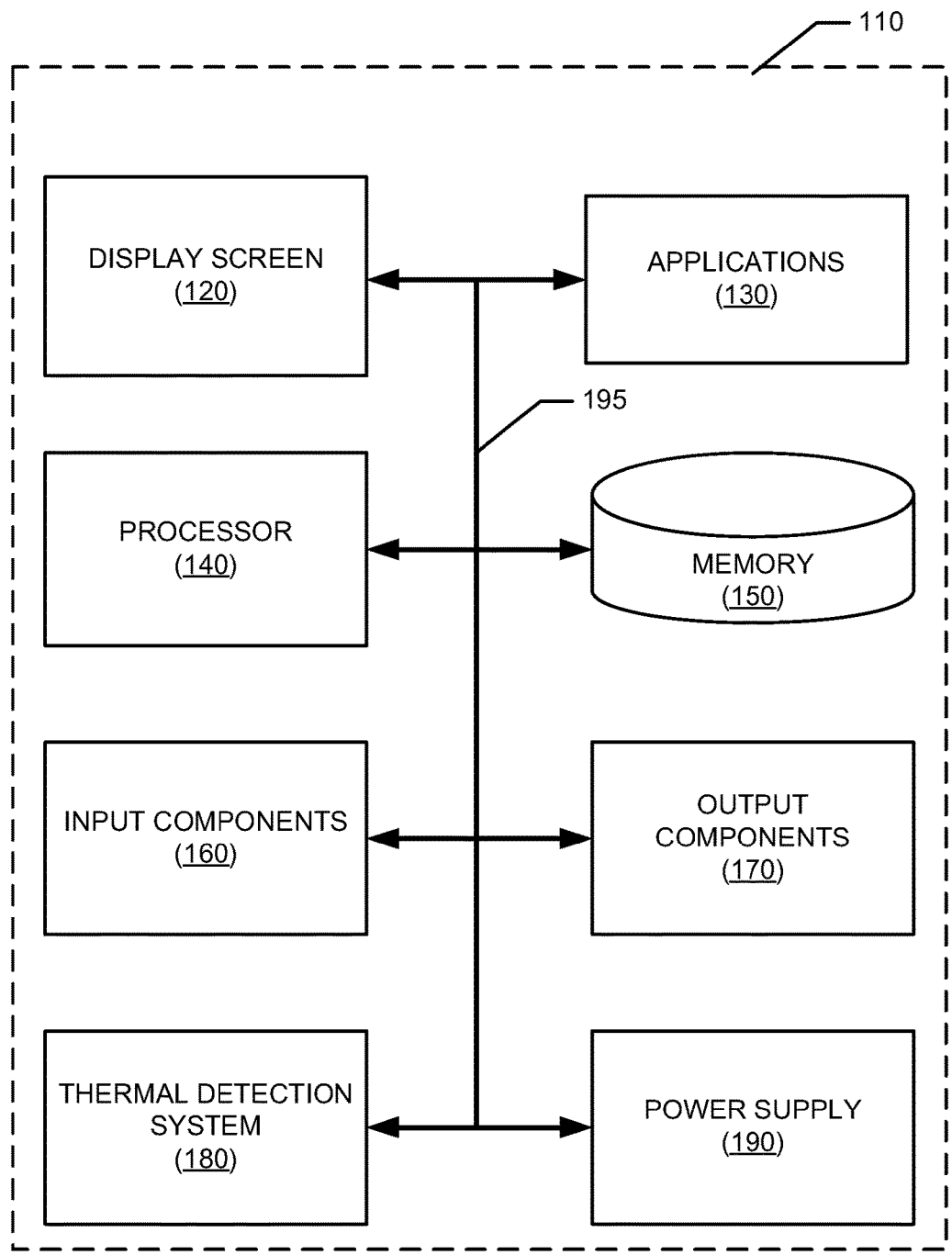
FIG. 1 is a simplified schematic of an example device with respect to which embodiments of the presently disclosed principles may be implemented.

Before presenting a detailed discussion of embodiments of the disclosed principles, an overview of certain embodiments is given to aid the reader in understanding the later discussion. As noted above, it is generally awkward and inconvenient to gather personal contact information from individuals attending a meeting or other gathering. This is especially true given the declining popularity and use of business cards. In essence, a user must query each person in attendance and physically either write down the responsive contact information or enter it into their device.

In an embodiment of the disclosed principles, the cellular phone, used herein as an example of a portable electronic device, is configured to automatically gather contact information after a gathering process is initiated, e.g., via a gesture. In a further embodiment, the gesture required to initiate the data gathering process is a spinning of the device, e.g., while the device is lying on its back on a table or other flat surface.

When the device is spun, accelerometers and/or gyroscopes within the device detect the spin motion to trigger the gathering process. Moreover, in an embodiment, the device employs the accelerometer and/or gyro in concert with a thermal sensor such as a digital thermopile ("Digipile") sensor to detect the presence of individuals and record their angular location as the phone rotates.

The spatial resolution and thermal detection range of the Digipile allow the device to sense and count all or most of the people in the room. In an embodiment, the device is also configured to identify individuals based on temperature signature, and in a further embodiment may employ movement as well for this purpose.

However, with respect to identifying those present, a short range wireless technology such as Bluetooth is used in an embodiment to assist in gathering the names of those present. In a further embodiment, a common database is provided correlating phones and/or Bluetooth ID's on a per phone basis. In an alternative or additional embodiment, the WiFi ID of user devices may also be used to identify users.

In an embodiment, an audio signal at a frequency outside of the human-audible range is used by the device to trigger other devices to send or broadcast their user-identifying data for collection by the main device. The actual transmission or broadcast of user-identifying data may also be executed via a human-inaudible audio transmission.

As alluded to above, a number of mechanisms may be used, alternatively or in combination, to identify persons in the vicinity of the primary device. In an embodiment, a relative thermal profile that has previously been associated with that person may be used for recognition purposes by the device. A thermal profile may indicate individual characteristics such as apparent height, manner of movement, amount of head hair (e.g., thick insulating hair, versus little or no hair), and so on. Since the thermal sensor is essentially a single pixel, characteristics are obtained via signal strength in a reading or signal strength is a series of readings. Alternatively or additionally a Bluetooth ID may be used for identification purposes. This may be appropriate where, for example, a shared database correlating individuals' phone and Bluetooth ID is available.

In an embodiment, the device is configured such that the handset can use relative position data collected during the spin and relative BT signal strength to associate people with devices. This is enhanced in an embodiment by use of a directional Bluetooth antenna. In this embodiment, during rotation of the device, the signal for each person spikes as the Bluetooth antenna primary direction passes that person.

In another embodiment, a WiFi ID is used to link a device and a directional WIFI signal to an individual. Additionally or alternatively, each responding device issues an IR (infrared) signal encoded with that user's ID such that the Digipile sensor of the querying device is able to receive and decode that signal, thus collecting user IDs as it spins. Each device's IR proximity transceiver may be used for transmitting the encoded IR signal. The IR-based name sending function is triggered manually by each user in an embodiment, but may be triggered automatically in an alternate embodiment, e.g., when so instructed by the IR transceiver on the spinning device.

In a typical device having IR sensing, an IR sensor faces forward with a large field of view. However, in an embodiment wherein the field of view of the IR sensor does not extend sufficiently sideways, users may hold their phone to face the spinning device for a robust transfer of information.

In an embodiment, all ID information is sent to all participating devices, e.g., via the IR signal. This function or another occurrence may be used in an embodiment to trigger a randomized pointer, used to select an individual in the room, e.g., for game play purposes.

With this overview in mind, and turning now to a more detailed discussion in conjunction with the attached figures, the techniques of the present disclosure are illustrated as being implemented in a suitable computing environment. The following device description is based on embodiments and examples of the disclosed principles and should not be taken as limiting the claims with regard to alternative embodiments that are not explicitly described herein. Thus, for example, while FIG. 1 illustrates an example mobile device within which embodiments of the disclosed principles may be implemented, it will be appreciated that other device types may be used, including but not limited to laptop computers, tablet computers, personal computers, embedded automobile computing systems and so on.

The schematic diagram of FIG. 1 shows an exemplary device 110 forming part of an environment within which aspects of the present disclosure may be implemented. In particular, the schematic diagram illustrates a user device 110 including several exemplary components. It will be appreciated that additional or alternative components may be used in a given implementation depending upon user preference, component availability, price point, and other considerations.

In the illustrated embodiment, the components of the user device 110 include a display screen 120, applications (e.g., programs) 130, a processor 140, a memory 150, one or more input components 160 such as speech and text input facilities, and one or more output components 170 such as text and audible output facilities, e.g., one or more speakers.

The processor 140 can be any of a microprocessor, microcomputer, application-specific integrated circuit, or the like. For example, the processor 140 can be implemented by one or more microprocessors or controllers from any desired family or manufacturer. Similarly, the memory 150 may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device). Additionally or alternatively, the memory 150 may include a read only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

Further with respect to the applications, these typically utilize the operating system to provide more specific functionality, such as file system service and handling of protected and unprotected data stored in the memory 150. Although many applications may provide standard or required functionality of the user device 110, in other cases applications provide optional or specialized functionality, and may be supplied by third party vendors or the device manufacturer.

Finally, with respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

Although not shown, the device 110 may include software and hardware networking components to allow communications to and from the device. Such networking components will typically provide wireless networking functionality, although wired networking may additionally or alternatively be supported.

In an embodiment, a power supply 190, such as a battery or fuel cell, may be included for providing power to the device 110 and its components. All or some of the internal components communicate with one another by way of one or more shared or dedicated internal communication links 195, such as an internal bus.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data, and toggling through various graphical user interface objects (e.g., toggling through various display icons that are linked to executable applications).

In an embodiment of the disclosed principles, the illustrated device 110 also includes a thermal detection system 180 equipped and configured to adaptively detect human thermal signatures. To accomplish such tasks, the thermal detection system 180 includes a number of systems and components, as will be described in greater detail below during the discussion of FIG. 2.

Figure 2:
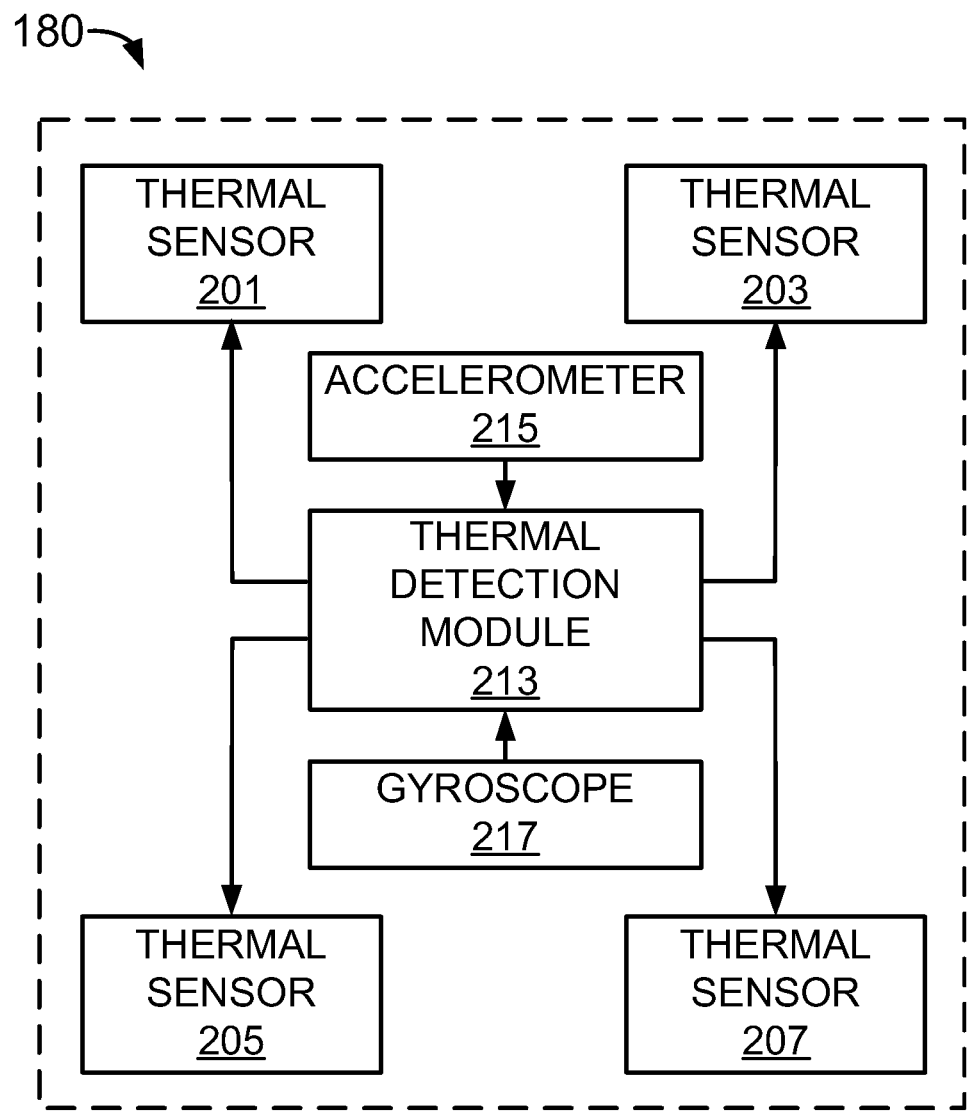
FIG. 2 is a modular schematic of the device of FIG. 1 for implementing embodiments of the presently disclosed principles.

Turning to FIG. 2, this figure illustrates the thermal detection system 180 of FIG. 1 in greater detail. In the illustrated example, the thermal detection system 180 includes one or more thermal sensors 201, 203, 205, 207. The thermal sensors 201, 203, 205, 207 may be of any suitable type, but in an embodiment, the thermal sensors 201, 203, 205, 207 are noncontact sensors configured to respond to a nearby heat source by providing a signal indicative of a magnitude of heat emitted by the source. Examples of suitable noncontact sensors include pyroelectric sensors, digital/MEMS thermopiles and others.

For the sake of example, a thermopile sensor will be briefly described in greater detail. Such a sensor may include a silicon-based thermopile chip with a number of thermoelements having an IR absorbing covering and an IR (infrared) transmissive top filter. The top filter largely determines the spectral sensitivity range of the device. Thus, in operation, IR that passes through the top filter is absorbed in the IR absorbing covering, thus eliciting a thermal response signal from the underlying thermoelements. While many thermopile devices output an analog signal, a digital thermopile sensor may instead be used for better device integration and lower complexity.

The thermal sensors 201, 203, 205, 207 are controlled by a thermal detection module 213. In operational overview, the thermal detection module 213 receives the output of each thermal sensor 201, 203, 205, 207 and processes the output to determine human presence with respect to each thermal sensor 201, 203, 205, 207.

The thermal detection system 180 also includes motion or orientation sensing devices. For example, in the illustrated embodiment, an accelerometer 215 and gyroscope 217 are included in the thermal detection system 180. It will be appreciated that the accelerometer 215 and gyroscope 217 may be dedicated resources of the thermal detection system 180 or may be resources of the device more generally. The accelerometer 215 comprises a three-axis accelerometer assembly in an embodiment, wherein motion along each of three perpendicular axes is detected by an accelerometer on that axis. The gyroscope 217 is also a three-axis device in an embodiment, such that rotation about any of three perpendicular axes. The three reference axes for the gyroscope 217 may coincide with the three reference axes for the accelerometer 215, although this co-incidence is not a requirement.

Figure 3:
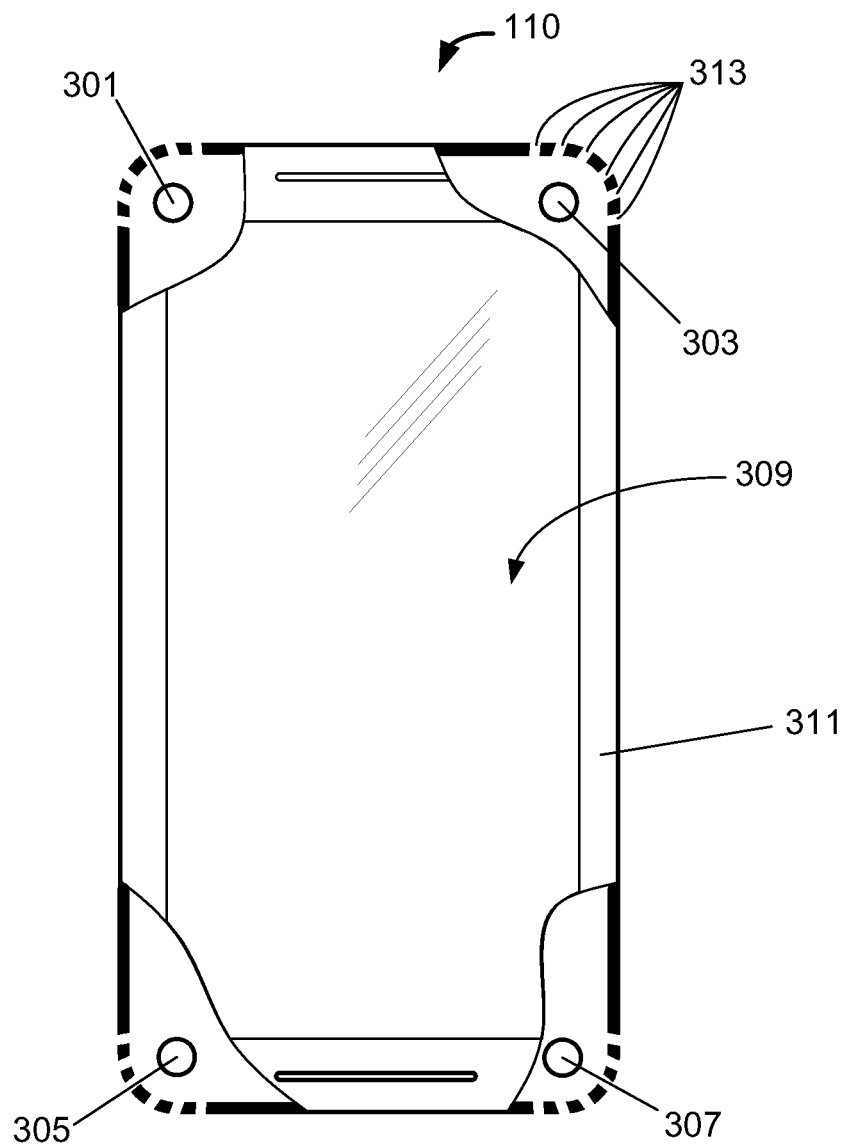
FIG. 3 is a partial cut away view of a device with respect to which embodiments of the presently disclosed principles may be implemented.

While various physical configurations of the described components are possible, one example physical configuration is shown in FIG. 3, in a partial cut away view. In the illustrated example, the electronic device 110 is of a rectangular planform. In the view shown, the front of the electronic device 110 is visible, including a user interface screen 309. The user interface screen 309 may be the display screen 120 discussed with reference to FIG. 1, or in the alternative, multiple screens may be used.

The user interface screen 309 is enclosed by or affixed to a housing 311. In an embodiment, the housing 311 contains the components of the electronic device 110 as described by reference to FIGS. 1 and 2, as well as optional or alternative components not shown.

A number of thermal sensors 301, 303, 305, 307 (corresponding, for example, to thermal sensors 201, 203, 205, 207 of FIG. 2) are positioned in the housing 311 outside of the user interface screen 309. To simplify viewing the placement of the thermal sensors 301, 303, 305, 307, the interface screen 309 and housing 311 are shown partially cut away.

As noted above, directionality in the detection of thermal profiles allows the system to determine seating order and to make identifications based on thermally visible characteristics. In the illustrated example, the ability to determine more accurately a direction from which a signal emanates is provided by a series of perforated slots or opening patterns through which to sense heat from outside of device 313 at the corners of the lateral edges of the housing 311.

The slots pass IR radiation from heat sources such as humans onto to the sensor active area and allow the outputs of the thermal sensors 301, 303, 305, 307 to be processed to yield thermal motion, direction and location information. The motion of a heat source past a given corner of the device 110 (or the motion of the given corner of the device past the heat source) is physically encoded as a series of pulses on the thermal sensor at that corner due to the slots 313. In the case of a stationary source (or stationary device), the thermal signal from each corner of the device is stable.

As discussed above, the back of the device, which is located opposite the visible face, is placed on a surface and the device is spun in one embodiment of the disclosed principles. This motion has a dual purpose: first, detection of the spinning motion triggers the data collection mode, and secondly, after the data collection mode is triggered, the continued spinning motion allows 360° of data collection from personnel in a horizontal disk around the spinning device.

The various structures and capabilities discussed above cooperate to allow beneficial device operation. For example, the device is able to execute automated data collection regarding personnel at a gathering in one embodiment and in a number of subsidiary embodiments. In overview, initiation of the data collection process may be gesture-based, and in an embodiment, a spinning of the device is detected and used to initiate the process.

The device then broadcasts a data request, e.g., via an IR or RF medium, and any surrounding devices may respond to the querying device with identification information or an address or key with which such information may be resolved. The data transmissions may be broadcast or addressed.

In an embodiment wherein the querying device includes a thermal sensor, the thermal sensor may be used during data collection as well. For example, the querying device may use the thermal sensor to count attendees, identify attendees by thermal signature, or identify locations for the responding devices so as to identify the locations of their respective users. It will be appreciated that the process steps discussed herein are generally executed by the processor 140 of the device 110, in conjunction with system controllers where appropriate. For example, RF communications may be initiated by the controller 140 and executed via an RF controller.

Figure 4:
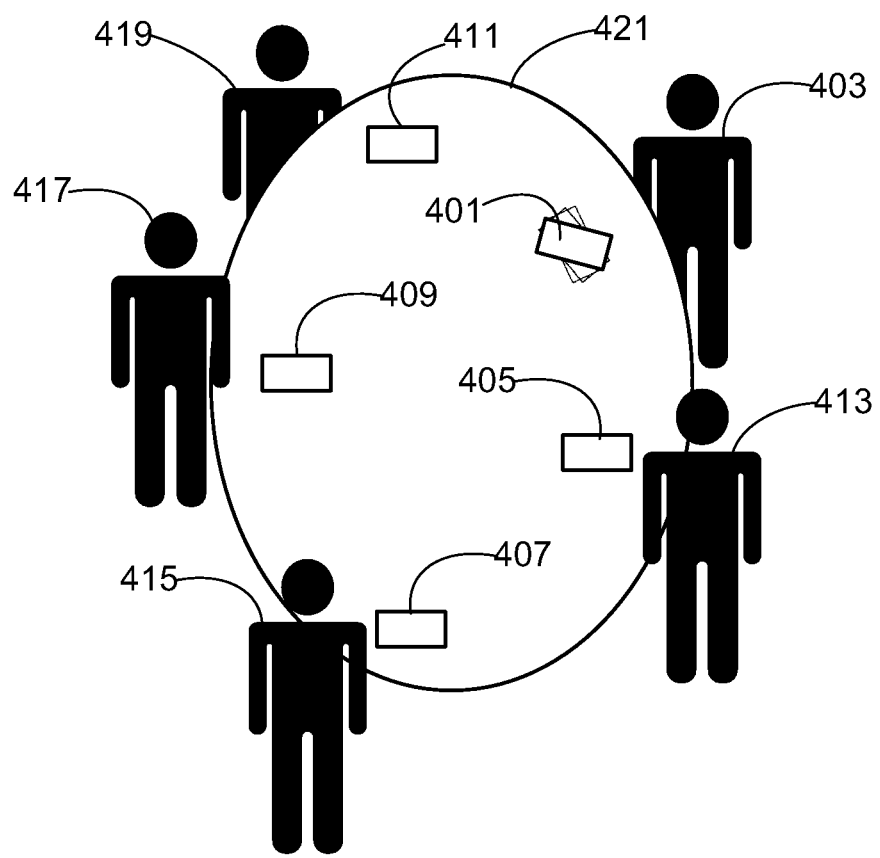
FIG. 4 is an overhead schematic drawing showing a primary device and individual and surrounding devices and individuals in keeping with an embodiment of the disclosed principles.

FIG. 4 is an overhead schematic drawing showing a usage scenario in keeping with an embodiment of the disclosed principles. More specifically, the figure shows a primary device 401 and associated user 403, as well as surrounding devices 405, 407, 409, 411 and respective associated users 413, 415, 417, 419. The primary device 401 is shown spinning on a table 421 around which the users 403, 413, 415, 417, 419 are gathered with their respective devices 401, 405, 407, 409, 411. In the illustrated embodiment, the primary device 401 will attempt to collect user ID data from the other devices 405, 407, 409, 411, and will potentially also gather thermal information regarding the other users 413, 415, 417, 419. The collected material is then used to compile a listing of users present and to execute a user-desired function based on that information.

Figure 5:
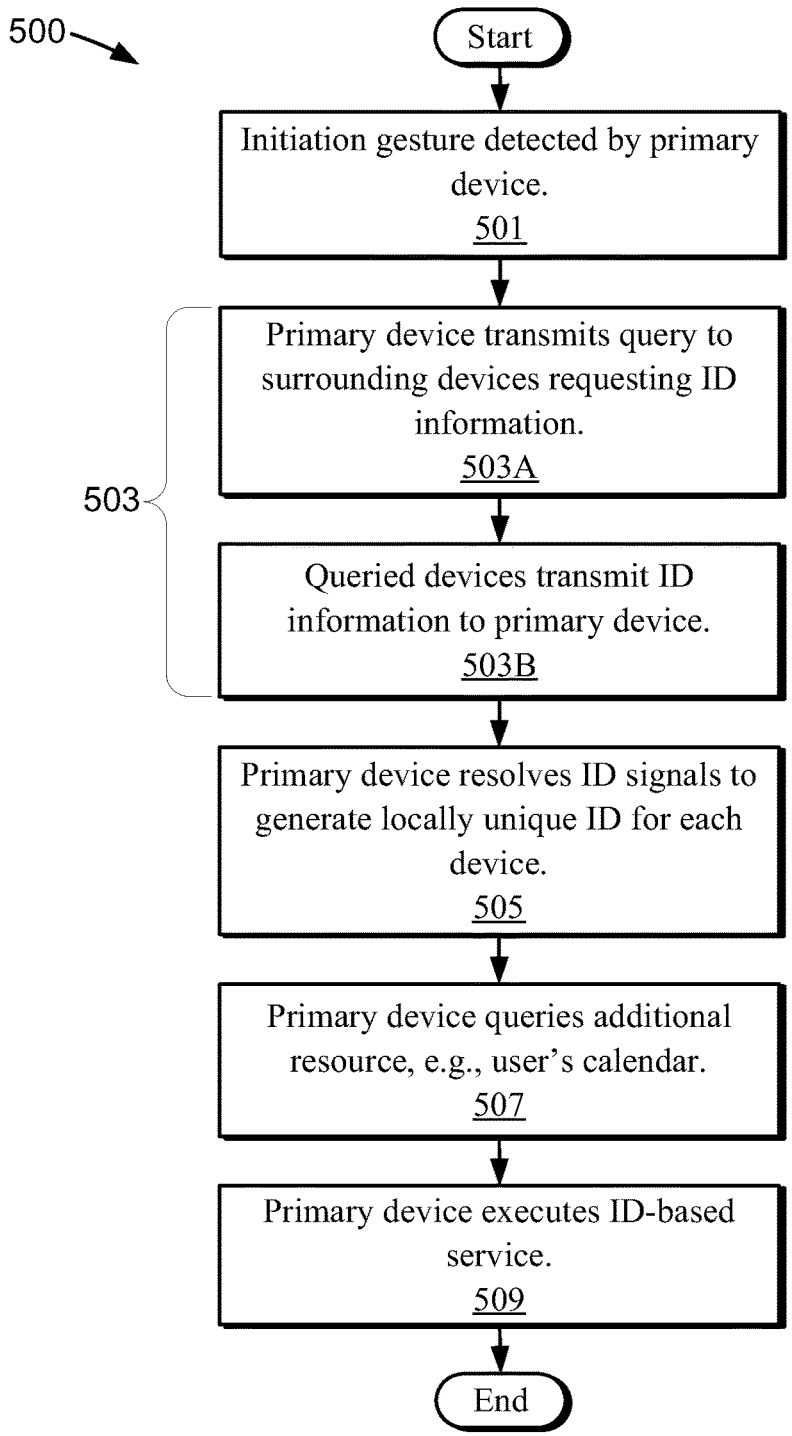
FIG. 5 is a flowchart of a process for gathering attendee data in accordance with an embodiment of the disclosed principles.

The flow chart of FIG. 5 illustrates a process 500 for gathering attendee data in accordance with an embodiment of the disclosed principles. At stage 501 of the process 500, the device detects a spinning motion or gesture. This detection may be made via detection of rotation through a gyroscope sensor set as discussed above, or may be otherwise detected. For example, in an embodiment, a magnetometer sensor within the device may detect a periodic decaying rotation of the device heading, with the rotation peaking at a frequency within a normal spinning range, e.g., 2-10 Hz.

Once the device has detected the spinning gesture, the process 500 flows to stage 503. Stage 503 is comprised of sub-stages 503A and 503B. Sub-stage 503A is executed in environments within which the devices providing data are not configured to routinely transmit information from which identity can be discerned. Thus at stage 503A, the device transmits a query to the surrounding devices requesting ID information from these devices. The query from the spinning device will typically not be addressed since the other device IDs are as yet unknown. Rather, the query in an embodiment is a broadcast query, e.g., transmitted via IR or RF signaling, or via both. As noted above, if the surrounding devices are already transmitting data usable to discern a suitable level of identity, then the process 500 may skip stage 503A and proceed directly to stage 503B.

At stage 503B, at least a subset of the queried devices return an ID signal to the spinning device. As with the query, the query responses may be transmitted via any suitable medium and as such need not be transmitted via the same medium as was used to transmit the query. Moreover, different queried devices may respond via different media, e.g., some by IR signaling and some by RF signaling. While the responses may be addressed, they may also be broadcast or multicast. In an embodiment, ultrasonic signaling is used by the querying device for the query and is optionally also employed by one or more of the responding devices when responding.

The nature of the data contained in the ID signal from each device may vary depending upon individual device capabilities and security settings. For example, some responses may provide user identity and some may provide only email identity or company identity. Moreover, the ID information need not be sent in the open, but may be provided via a link to a secure database, shared codebook, or other limited access mechanism.

At stage 505, which may be executed before, after, or during the execution of stage 503, the device resolves any coded ID signals to generate a locally unique ID for each device. For example, if an ID signal contained a key to a table or codebook, then the device resolves that data to the final ID value, and if the ID signal contained a link to ID data, the device follows the link and obtains any available ID data. The locally unique ID may be a name, nickname, account number and so on.

Having received all available ID data, the device processes the ID data to generate a user product, such as a list of attendees, a list of missing attendees, a seating plan, etc. As part of this, additional data may be needed, e.g., to check for intended attendees and so on. Thus at stage 507, the device queries an additional resource, which in this example is the calendar of the spinning device's user as well, potentially, as the calendar of one or more users not present, to acquire additional meeting data. Thus, for example, the additional meeting data may comprise data identifying required attendees, optional attendees, and missing attendees.

The additional data is used at stage 509 to execute a next step. For example, the calendar data for a missing required attendee may be used to determine that the missing user is now a required attendee at another meeting elsewhere and need not be contacted. Alternatively, if the missing required attendee has an otherwise open calendar during the present meeting, the next step would be to contact that user to produce attendance at the current meeting. Similarly, stage 509 may comprise simply listing the attendees to the user of the primary device or storing or transmitting a listing of the attendees.

For devices having thermal detection capabilities as discussed above with reference to FIGS. 2 and 3, this capability is utilized in an embodiment to count the people in the room (i.e., at the meeting), and enhance the ID and counting aspects provided via transmissions. For example, thermal sensors are used in an embodiment to count the number of nearby individuals in the room. In a further embodiment, gathered thermal data is used to identify individuals where possible. For example, from a group of potential matches, e.g., from a meeting schedule, some individuals can be differentiated by overall thermal signature strength, movement pattern or unique pattern features (e.g., between a person with a shaved head or beard and a person lacking these features.

Figure 6:
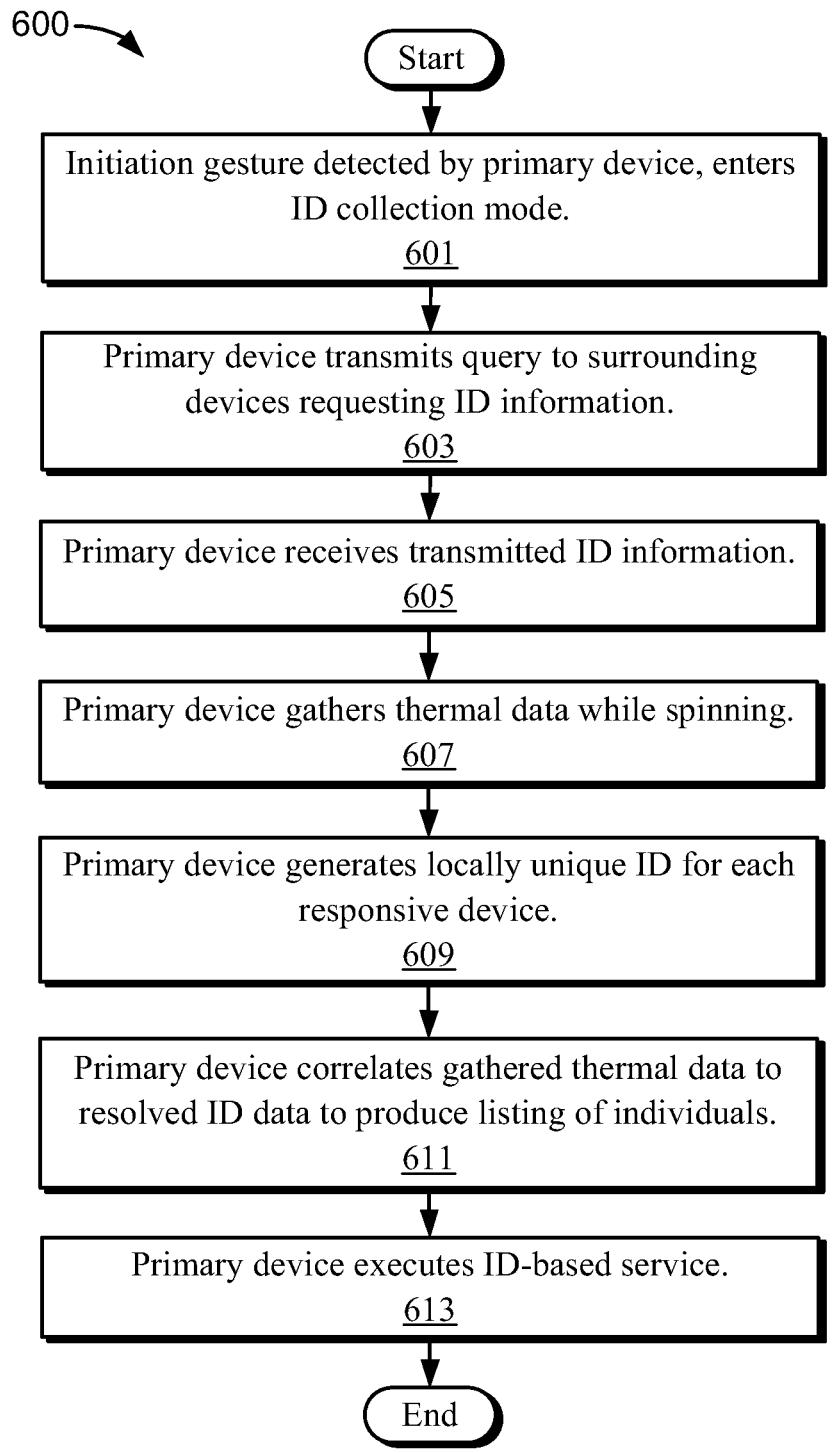
FIG. 6 is a flowchart of an alternative process for gathering attendee data in accordance with an embodiment of the disclosed principles.

The flow chart of FIG. 6 illustrates a process 600 for employing thermal sensor facilities in addition to inertial and gyroscopic sensors to identify and enumerate individuals at a gathering and to execute a user-desired function based on the gathered data. At stage 601 of the process 600, executed after the user has spun the device, the spinning device (primary device) detects the spinning motion and enters ID data collection mode. In this mode, the primary device queries the surrounding devices at stage 603, and receives responsive ID signals at stage 605. It will be appreciated that in an environment in which the surrounding devices are already transmitting ID signals, no query is needed.

At stage 607, the primary device also gathers thermal data as it spins. As noted above, this data may include the presence or absence of a thermal signal in any region as well as characteristics of the thermal signals that are present as a function of device rotation. resolve ID data The device resolves the received ID signals, to the extent necessary, to produce locally unique ID information for each surrounding device at stage 609, and correlates the gathered thermal data to the resolved ID data at stage 611 to produce a listing of individuals present. At this stage, the thermal data is used, in an embodiment, to fill gaps in the returned ID signals (e.g., some users may not carry a device) or otherwise to confirm that the number of IDs matches number present. If the number of responding devices exceeds the number of individualizable thermal signals, the device may check the listing for duplicates.

Finally at stage 613, the primary device executes a user-desired function. As noted above, this may include contacting missing required attendees, listing the attendees to the user of the primary device or storing or transmitting a listing of the attendees.

It will be appreciated that various systems and processes for automated attendee data collection have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A mobile device capable of identifying persons near the mobile device comprising:
   a wireless signaling system including an incoming wireless signal receiver;
   a device motion sensing system including at least a first sensor; and
   a controller configured to determine, based on a signal generated by the first sensor, whether the device is being moved in accordance with a predetermined gesture and entering a personnel data collection mode, if it is determined that the device is being moved in accordance with a predetermined gesture, whereby the device receives an identification signal at the incoming wireless signal receiver from at least one other device and generates a personnel identification based on the received identification signal.

2. The mobile device in accordance with claim 1, wherein the wireless signaling system further comprises an outgoing wireless signal transmitter and wherein the controller is further configured to query the at least one other device via the outgoing wireless signal transmitter prior to receiving the identification signal at from at least one other device.

3. The mobile device in accordance with claim 1, wherein the predetermined gesture is a spinning gesture.

4. The mobile device in accordance with claim 1, wherein the first sensor is an inertial sensor.

5. The mobile device in accordance with claim 1, wherein the first sensor is a magnetometer.

6. The mobile device in accordance with claim 1, wherein the first sensor is a gyroscope.

7. The mobile device in accordance with claim 1, wherein the device motion sensing system further includes a second sensor, and wherein the first sensor and the second sensor are selected from the group consisting of an accelerometer, a gyroscope, a gravitometer and a magnetometer.

8. The mobile device in accordance with claim 1 further comprising at least one thermal sensor, wherein the controller is further configured to use the at least one thermal sensor to generate a personnel identification.

9. The mobile device in accordance with claim 1 further comprising at least one thermal sensor, wherein the controller is further configured to use the at least one thermal sensor to count personnel.

10. The mobile device in accordance with claim 1, wherein the incoming wireless signal receiver includes a thermal sensor.

11. The mobile device in accordance with claim 1, wherein the incoming wireless signal receiver includes a radio frequency (RF) receiver.

12. The mobile device in accordance with claim 2, wherein the outgoing wireless signal transmitter has a type selected from the group consisting of infrared and RF.

13. The mobile device in accordance with claim 1, wherein the identification signal is one of a Bluetooth ID and a WiFi ID.

14. A method of identifying personnel around a mobile device comprising:
   detecting a predetermined gesture with respect to the mobile device;
   based on detecting the predetermined gesture, entering a personnel data collection mode;
   while in the personnel data collection mode, receiving an identification signal from another device within short range communication distance of the mobile device, the other device being associated with a user; and
   generating an identification of the user at the mobile device based on the received identification signal.

15. The method in accordance with claim 14, wherein the wireless signaling system further comprises an outgoing wireless signal transmitter and wherein the controller is further configured to query the at least one other device via the outgoing wireless signal transmitter prior to receiving the identification signal at from at least one other device.

16. The method in accordance with claim 14, wherein the predetermined gesture is a spinning gesture.

17. The method in accordance with claim 14, further comprising counting personnel around the mobile device via thermal sensing.

18. The method in accordance with claim 14, wherein the identification signal is one of a radio frequency (RF) signal and an infrared (IR) signal.

19. The method in accordance with claim 14, wherein the identification signal includes one of a Bluetooth ID and a WiFi ID.

20. A mobile device comprising:
   a movement sensor operable to generate a movement signal responsive to movement of the mobile device;
   a signal sensor operable to receive wireless transmissions at the mobile device; and
   a controller configured to detect via the movement signal that the mobile device has been moved in a predetermined gesture and, in response, to enter a personnel data collection mode wherein the mobile device receives via the signal sensor an identification signal from another device associated with a user and, in response, generates an identification of the user.

* * * * *